US012734667B2

(12) United States Patent
Li et al.

(10) Patent No.: US 12,734,667 B2
(45) Date of Patent: Sep. 15, 2026

(54) PIPE WRENCH

(71) Applicant: Milwaukee Electric Tool Corporation, Brookfield, WI (US)

(72) Inventors: Cheng Zhang Li, Sussex, WI (US); Scott M. Hangartner, Hartland, WI (US); Andrew G. Wagner, Lisbon, WI (US); Brian J. Doyle, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 352 days.

(21) Appl. No.: 17/223,411

(22) Filed: Apr. 6, 2021

(65) Prior Publication Data

US 2021/0220985 A1 Jul. 22, 2021

Related U.S. Application Data

(62) Division of application No. 15/976,939, filed on May 11, 2018, now Pat. No. 10,994,405.

(Continued)

(51) Int. Cl.
*B25G 1/04* (2006.01)
*B25B 13/48* (2006.01)
(Continued)

(52) U.S. Cl.
CPC .......... *B25G 1/043* (2013.01); *B25B 13/5058* (2013.01); *B25B 23/16* (2013.01);
(Continued)

(58) Field of Classification Search
CPC ........ B25G 1/043; B25G 1/105; B25G 1/102; B25B 13/5058; B25B 13/481; B25B 23/16
(Continued)

(56) References Cited

U.S. PATENT DOCUMENTS

| | | | |
|---|---|---|---|
| 59,852 | A | 11/1866 | McLaren |
| 179,276 | A | 6/1876 | Crosby |

(Continued)

FOREIGN PATENT DOCUMENTS

| | | |
|---|---|---|
| CN | 2726826 | 9/2005 |
| CN | 201102213 | 8/2008 |

(Continued)

OTHER PUBLICATIONS https://www.google.com/search?q=standard+pipe+wrench+sizes&rlz=1C1GCEB_enUS918US918&ei=FHNDYt3sGISYptQPnoK50Ao&ved=0ahUKEwjdxuiVm-z2AhUEjlkEHR5BDqoQ4dUDCA4&uact=5&oq=standard+pipe+wrench+sizes&gs_lcp=Cgdnd3Mtd2I6EAMyBwgAEEcQsAMyBwgAEEcQsAMyBwgAEEcQsAMyBwgAEEcQsAMyBwgAEEcQsAMyBwgAEEcQsAMyBwgAEEcQsAMyBwgAEEcQsANKBAhBGABKBAhGGABQAFgAYPQZaAFwAXgAgAEAiAEAkgEAmAEAyAEIwAEB&sclient=gws-wiz (Year: 2022).

(Continued)

*Primary Examiner* — Hadi Shakeri
(74) *Attorney, Agent, or Firm* — Reinhart Boerner Van Deuren s.c.

(57) ABSTRACT

A wrench includes a body having a head and a handle portion defining a longitudinal axis. The wrench includes a first jaw coupled to the head with the first jaw including first teeth and an edge. The edge defines a width of the first jaw. The wrench includes a second jaw extending through an aperture of the head with the second jaw including a threaded portion and second teeth. The wrench includes an actuator coupled to the threaded portion of the second jaw such that rotation of the actuator relative to the second jaw moves the second teeth relative to the first teeth. A length is measured from the edge of the first jaw to the second end of the handle portion parallel to the longitudinal axis. A ratio of the width of the first jaw over the length is less than 0.06.

18 Claims, 9 Drawing Sheets

Related U.S. Application Data

(60) Provisional application No. 62/524,250, filed on Jun. 23, 2017, provisional application No. 62/504,778, filed on May 11, 2017.

(51) Int. Cl.
*B25B 13/50* (2006.01)
*B25B 23/16* (2006.01)
*B25G 1/10* (2006.01)

(52) U.S. Cl.
CPC ............ *B25G 1/105* (2013.01); *B25B 13/481* (2013.01); *B25G 1/102* (2013.01)

(58) Field of Classification Search
USPC .......................................................... 81/164
See application file for complete search history.

(56) References Cited

U.S. PATENT DOCUMENTS

| | | | | | |
|---|---|---|---|---|---|
| 461,769 | A | | 10/1891 | Patton | |
| 483,785 | A | | 10/1892 | Hilts | |
| 530,419 | A | * | 12/1894 | Johnston | B25B 13/16 81/177.1 |
| 592,031 | A | | 10/1897 | Waitt | |
| 869,097 | A | | 10/1907 | Mandl | |
| 954,335 | A | | 4/1910 | Page | |
| 966,300 | A | | 8/1910 | Bennett | |
| 992,127 | A | | 5/1911 | Hachmann | |
| 998,271 | A | | 7/1911 | Barabe | |
| 1,000,724 | A | | 8/1911 | Duffey | |
| 1,032,035 | A | | 7/1912 | Beck | |
| 1,074,936 | A | | 10/1913 | Evans | |
| 1,129,771 | A | | 2/1915 | Wolfe | |
| 1,163,233 | A | | 12/1915 | Haban | |
| 1,204,999 | A | | 11/1916 | McCord | |
| 1,209,002 | A | | 12/1916 | Martin | |
| 1,288,248 | A | | 12/1918 | Snowdon | |
| 1,334,392 | A | | 3/1920 | Lumpkin | |
| 1,345,983 | A | | 7/1920 | Bell | |
| 1,353,246 | A | | 9/1920 | Kiefer | |
| 1,356,577 | A | | 10/1920 | Wiertz | |
| 1,362,845 | A | | 12/1920 | Carr | |
| 1,380,052 | A | | 5/1921 | Fowble | |
| 1,395,952 | A | | 11/1921 | Fraro | |
| 1,449,386 | A | | 3/1923 | Evans et al. | |
| 1,492,478 | A | | 4/1924 | Markovich | |
| 1,504,870 | A | | 8/1924 | Coughlin | |
| 1,542,123 | A | | 6/1925 | Eifel | |
| 1,563,242 | A | | 11/1925 | Tweit | |
| 1,565,338 | A | | 12/1925 | Thewes | |
| 1,589,736 | A | | 6/1926 | Bell | |
| 1,589,763 | A | | 6/1926 | Ratcliff | |
| 1,599,399 | A | | 9/1926 | Bjornson et al. | |
| 1,652,355 | A | | 12/1927 | Hammer | |
| 1,662,002 | A | | 3/1928 | Dowd | |
| 1,697,764 | A | | 1/1929 | Heinz | |
| 1,727,623 | A | | 9/1929 | Thewes | |
| 1,862,002 | A | | 6/1932 | Brungardt | |
| 2,063,318 | A | | 12/1936 | Larson | |
| 2,076,830 | A | | 4/1937 | Thewes | |
| 2,116,743 | A | | 5/1938 | Henderson | |
| 2,192,702 | A | | 3/1940 | Wright | |
| 2,282,148 | A | * | 5/1942 | Mandl | B25G 1/043 74/544 |
| 2,483,713 | A | | 10/1949 | Seaver | |
| 2,502,407 | A | | 3/1950 | Gordon | |
| 2,517,729 | A | | 8/1950 | Smith | |
| 2,520,652 | A | * | 8/1950 | Pfauser | B25G 1/005 74/544 |
| 2,528,814 | A | | 11/1950 | Boyer | |
| 2,650,512 | A | | 9/1953 | Johnson et al. | |
| 2,691,317 | A | | 10/1954 | Olson | |
| 2,696,133 | A | | 12/1954 | Burgess | |
| 2,700,911 | A | | 2/1955 | Dyczynski | |
| 2,813,443 | A | | 11/1957 | St. Pierre | |
| 2,825,254 | A | | 3/1958 | Peltcher | |
| 2,959,996 | A | | 11/1960 | Wheeler | |
| 3,280,667 | A | | 10/1966 | Woodling | |
| 3,280,671 | A | | 10/1966 | Woodling | |
| 3,657,949 | A | | 4/1972 | Myers | |
| 3,802,466 | A | | 4/1974 | Panella | |
| 3,956,949 | A | | 5/1976 | Romano | |
| 3,996,820 | A | | 12/1976 | Tuell | |
| 4,277,197 | A | * | 7/1981 | Bingham | F16B 7/149 403/104 |
| 4,541,313 | A | | 9/1985 | Wise | |
| 4,572,037 | A | | 2/1986 | Jeng-Shyong | |
| 4,580,468 | A | | 4/1986 | Cox | |
| 4,597,315 | A | | 7/1986 | Chen | |
| 4,820,216 | A | * | 4/1989 | Masters | B63H 16/04 416/70 R |
| 4,831,903 | A | | 5/1989 | Dausey et al. | |
| 5,152,198 | A | | 10/1992 | Schmitz, Jr. | |
| 5,251,518 | A | | 10/1993 | Woo | |
| 5,331,868 | A | | 7/1994 | Elmore | |
| 5,392,673 | A | | 2/1995 | Scott | |
| 5,517,884 | A | | 5/1996 | Sanders | |
| 5,542,319 | A | | 8/1996 | Wei | |
| 5,823,076 | A | | 10/1998 | Binkowski | |
| 5,832,793 | A | | 11/1998 | Collins | |
| 5,862,722 | A | | 1/1999 | Cislo | |
| 5,927,159 | A | | 7/1999 | Yokoyama et al. | |
| 5,957,008 | A | | 9/1999 | Long | |
| 5,960,683 | A | | 10/1999 | Malkin et al. | |
| 6,026,714 | A | | 2/2000 | Chang | |
| 6,089,129 | A | | 7/2000 | Huang | |
| 6,098,505 | A | | 8/2000 | Chang | |
| 6,131,491 | A | | 10/2000 | Hirse | |
| D435,410 | S | | 12/2000 | Lin | |
| 6,167,784 | B1 | | 1/2001 | Lin | |
| 6,223,632 | B1 | | 5/2001 | Johnson | |
| 6,257,102 | B1 | | 7/2001 | Perry | |
| 6,298,754 | B1 | | 10/2001 | Brown | |
| 6,305,251 | B1 | | 10/2001 | Pasbrig | |
| 6,311,586 | B1 | | 11/2001 | Hirse | |
| 6,327,943 | B1 | | 12/2001 | Wrigley et al. | |
| 6,334,377 | B1 | | 1/2002 | Wu | |
| 6,336,381 | B2 | | 1/2002 | McDonnell | |
| 6,349,621 | B1 | | 2/2002 | Khachatoorain | |
| 6,393,951 | B1 | | 5/2002 | Jansson et al. | |
| 6,431,033 | B1 | | 8/2002 | Cheng | |
| 6,477,921 | B1 | | 11/2002 | Picone | |
| D467,151 | S | | 12/2002 | Ho | |
| D474,380 | S | | 5/2003 | Chartier et al. | |
| 6,568,283 | B2 | | 5/2003 | Fanguy | |
| D483,238 | S | | 12/2003 | Hsieh | |
| D483,785 | S | | 12/2003 | Laituri | |
| 6,698,317 | B1 | * | 3/2004 | Machovsky | B25B 13/02 81/177.5 |
| 6,742,419 | B2 | | 6/2004 | Chartier et al. | |
| D494,030 | S | | 8/2004 | Burry | |
| 6,810,775 | B2 | | 11/2004 | Yang | |
| 6,925,686 | B2 | * | 8/2005 | Heathcock | B25G 1/04 16/427 |
| 6,931,969 | B2 | | 8/2005 | Hsien | |
| 6,938,525 | B2 | | 9/2005 | Poole et al. | |
| 6,961,973 | B1 | | 11/2005 | Smith | |
| 6,966,242 | B2 | | 11/2005 | Picone | |
| 6,971,288 | B2 | | 12/2005 | Wei | |
| 7,040,199 | B2 | | 5/2006 | Gregory | |
| 7,044,030 | B2 | | 5/2006 | Chartier et al. | |
| 7,059,221 | B2 | | 6/2006 | Simon | |
| 7,096,764 | B2 | | 8/2006 | Dong | |
| 7,114,824 | B2 | | 10/2006 | Picone | |
| 7,131,355 | B2 | | 11/2006 | Williams | |
| D546,148 | S | | 7/2007 | Becker | |
| D564,848 | S | | 3/2008 | Salazar et al. | |
| D571,172 | S | | 6/2008 | Yu | |
| 7,472,630 | B1 | | 1/2009 | Velluzzi | |
| 7,546,784 | B1 | | 6/2009 | Yu | |
| 7,578,219 | B2 | | 8/2009 | Wu | |
| 7,878,094 | B2 | * | 2/2011 | Lin | B25G 1/043 81/177.2 |

(56) References Cited

U.S. PATENT DOCUMENTS

| | | | |
|---|---|---|---|
| 7,882,768 | B2 | 2/2011 | Urquizu Osa |
| D657,213 | S | 4/2012 | Pond et al. |
| 8,176,816 | B2 * | 5/2012 | Simon .................... B25B 13/04 81/170 |
| D676,727 | S | 2/2013 | Martin et al. |
| 8,549,961 | B2 | 10/2013 | Huang |
| 2001/0035076 | A1 | 11/2001 | Gilbert |
| 2003/0015068 | A1 | 1/2003 | Pool et al. |
| 2003/0110905 | A1 | 6/2003 | Lacey |
| 2003/0183048 | A1 | 10/2003 | Olsen |
| 2004/0237731 | A1 | 12/2004 | Ha |
| 2005/0204873 | A1 | 9/2005 | Ana |
| 2005/0243553 | A1 | 11/2005 | Picone |
| 2006/0053982 | A1 | 3/2006 | Mo |
| 2006/0196319 | A1 | 9/2006 | Hung et al. |
| 2007/0074608 | A1 | 4/2007 | Mo |
| 2007/0125205 | A1 | 6/2007 | Beckwith et al. |
| 2007/0245861 | A1 | 10/2007 | Shields |
| 2008/0276762 | A1 | 11/2008 | Dein |
| 2009/0193940 | A1 | 8/2009 | Kuo |
| 2009/0217790 | A1 | 9/2009 | Harter |
| 2010/0050825 | A1 | 3/2010 | May |
| 2010/0083798 | A1 | 4/2010 | Tai |
| 2010/0122612 | A1 | 5/2010 | Kovach et al. |
| 2010/0242686 | A1 | 9/2010 | Gower |
| 2011/0232427 | A1 | 9/2011 | Streater et al. |
| 2014/0007744 | A1 | 1/2014 | Watson et al. |
| 2014/0069238 | A1 | 3/2014 | Chang |
| 2014/0083260 | A1 | 3/2014 | Kundracik et al. |
| 2015/0000476 | A1 | 1/2015 | Li |
| 2015/0360351 | A1 * | 12/2015 | Harvey .............. B25B 13/5058 81/167 |

FOREIGN PATENT DOCUMENTS

| | | |
|---|---|---|
| CN | 201511326 | 6/2010 |
| CN | 204431137 | 7/2015 |
| DE | 202006018047 | 3/2007 |
| GB | 711231 | 6/1954 |
| GB | 753198 | 7/1956 |
| JP | 6021856 | 3/1994 |
| TW | 234970 | 11/1994 |
| TW | 309827 | 7/1997 |
| TW | 451783 | 8/2001 |
| TW | 493505 | 7/2002 |
| TW | 501520 | 9/2002 |
| TW | M311538 | 5/2007 |
| TW | M344224 | 11/2008 |
| TW | M440851 | 11/2012 |
| TW | M465252 | 11/2013 |
| TW | M471338 | 2/2014 |
| WO | WO9740964 | 11/1997 |

OTHER PUBLICATIONS

Extended European Search Report for Application No. 14775769.4 dated Feb. 24, 2017 (10 pages).

* cited by examiner

PIPE WRENCH

CROSS-REFERENCE TO RELATED APPLICATIONS

This application is a divisional of U.S. application Ser. No. 15/976,939, filed May 11, 2018, which claims priority to U.S. Provisional Patent Application No. 62/524,250 filed on Jun. 23, 2017 and U.S. Provisional Patent Application No. 62/504,778 filed on May 11, 2017, the entire contents of all of which are herein incorporated by reference.

FIELD OF THE INVENTION

The present invention relates to wrenches, and more particularly to pipe wrenches.

BACKGROUND

Pipe wrenches are typically used to rotate, tighten, or otherwise manipulate workpieces (e.g., pipes, valves, fittings, other plumbing components, etc.). Some types of pipe wrenches include a bottom jaw and a hook jaw movable with respect to the bottom jaw to adjust the spacing between the jaws. Because pipe wrenches are often used to apply torque to round work pieces, the jaws typically include teeth for improved grip.

In some instances, to increase a length of a handle of a conventional pipe wrench, a piece of conduit is crimped onto the handle. By coupling the conduit to the handle, an overall weight of the pipe wrench increases and modifications to the tool may affect life of the tool or may lead to premature failure.

SUMMARY

In one aspect, a wrench includes a body having a head with an aperture and a handle portion having a bore. The handle portion defines a longitudinal axis. The wrench also includes a first jaw coupled to the head with the first jaw including first teeth, a second jaw extending through the aperture of the head with the second jaw including a threaded portion and second teeth, an actuator coupled to the threaded portion of the second jaw such that rotation of the actuator relative to the second jaw moves the second teeth of the second jaw relative to the first teeth of the first jaw, and an extension handle slidably received within the bore of the handle portion along the longitudinal axis. The extension handle is moveable relative to the handle portion between a retracted position and an extended position. The wrench further includes a locking mechanism including a collar coupled to the handle portion and moveable into a locked position to inhibit movement of the extension handle relative to the handle portion and an unlocked position to allow movement of the extension handle relative to the handle portion. The collar includes an opening sized for the extension handle to extend through the opening. The locking mechanism also includes a wedge engageable with the handle portion and the extension handle when the collar is in the locked position.

In another aspect, a wrench includes a body having a head with an aperture and a handle portion having a bore. The handle portion defines a longitudinal axis. The wrench also includes a first jaw coupled to the head with the first jaw including first teeth, a second jaw extending through the aperture of the head with the second jaw including a threaded portion and second teeth, an actuator coupled to the threaded portion of the second jaw such that rotation of the actuator relative to the second jaw moves the second teeth of the second jaw relative to the first teeth of the first jaw, and an extension handle coupled within the bore of the handle portion in a first orientation and a second orientation. The extension handle includes a first gripping portion defining a first length with the first gripping portion extending beyond the handle portion when the extension handle is in the first orientation, a second gripping portion defining a second length with the second length being less than the first length. The second gripping portion extends beyond the handle portion when the extension handle is in the second orientation. The extension handle also includes a locking member positioned between the first gripping portion and the second gripping portion. The locking member engages the handle portion to secure the extension handle in the first orientation and the second orientation.

In yet another aspect, a wrench includes a body having a head with an aperture and a handle portion defining a longitudinal axis. The longitudinal axis centrally extends through a first end of the handle portion adjacent the head and a second end of the handle portion opposite the first end. The wrench also includes a first jaw coupled to the head with the first jaw including first teeth and an edge. The edge is transverse to the longitudinal axis and distal to the aperture of the head. The edge defines a width of the first jaw. The wrench further includes a second jaw extending through the aperture of the head with the second jaw including a threaded portion and second teeth. The wrench further includes an actuator coupled to the threaded portion of the second jaw such that rotation of the actuator relative to the second jaw moves the second teeth of the second jaw relative to the first teeth of the first jaw. A length is measured from the edge of the first jaw to the second end of the handle portion parallel to the longitudinal axis. A ratio of the width of the first jaw over the length is less than 0.06.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially" or "about" are understood by those of ordinary skill to refer to reasonable ranges outside of the given value, for example, general tolerances associated with manufacturing, assembly, and use of the described embodiments.

DETAILED DESCRIPTION

Figure 1:
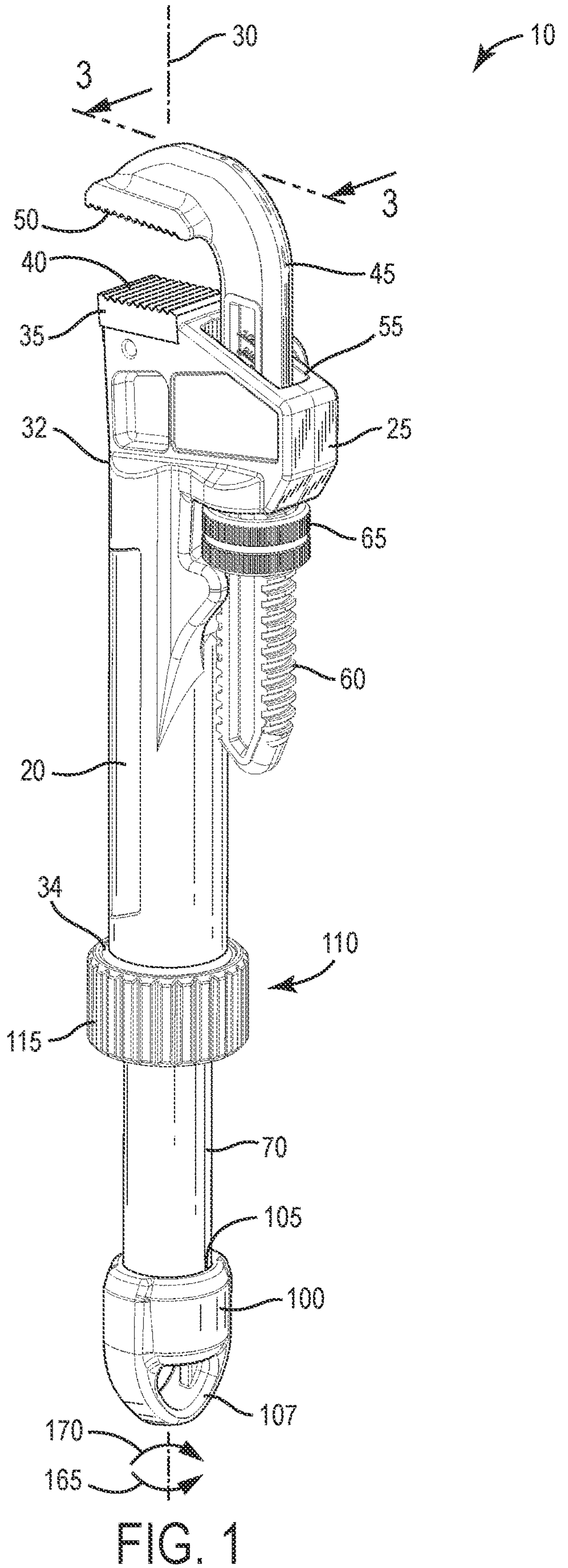
FIG. 1 is a perspective view of a wrench according to an embodiment of the invention including an extension handle slidably coupled to a body of the wrench.

FIG. 1 illustrates a wrench 10 according to an embodiment of the invention. The wrench 10 includes a body 15 having a handle or gripping portion 20 and a head 25. The illustrated handle portion 20 is integrally formed with the head 25 as a single component. The handle portion 20 is substantially cylindrical and defines a longitudinal axis 30. The longitudinal axis 30 centrally extends through a first end 32 of the handle portion 20 adjacent the head 25 and a second end 34 of the handle portion 20 opposite the first end 32.

The wrench 10 also includes a first or bottom jaw 35, which includes first teeth 40, coupled (fixedly or removably coupled) to the head 25. The wrench 10 further includes a second or hook jaw 45, which includes second teeth 50, extending through an aperture 55 of the head 25. The hook jaw 45 includes threads 60 that engage an actuator or thumb wheel 65 so that when the thumb wheel 65 is rotated in a desired direction, the hook jaw 45 moves in a direction substantially parallel to the longitudinal axis 30 of the handle portion 20 for a distance between the first teeth 40 of the bottom jaw 35 and the second teeth 50 of the hook jaw 45 to be adjusted. Accordingly, as the thumb wheel 65 rotates in a first direction, the second teeth 50 of the hook jaw 45 move toward the first teeth 40 of the bottom jaw 35 for the teeth 40, 50 to grip a workpiece positioned between the bottom jaw 35 and the hook jaw 45. Alternatively, as the thumb wheel 65 rotates in a second direction, the second teeth 50 of the hook jaw 45 move away from the first teeth 40 of the bottom jaw 35 for the teeth 40, 50 to release the workpiece.

Figure 2:
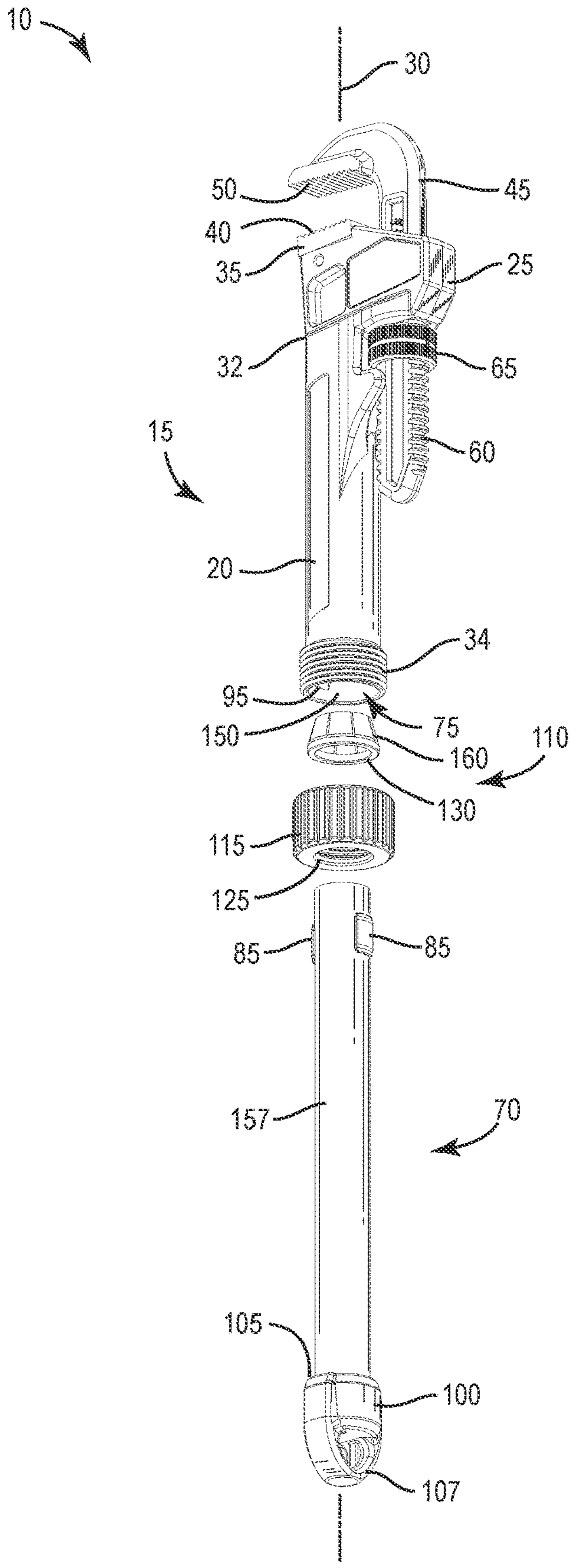
FIG. 2 is a partially exploded view of the wrench of FIG. 1.

With reference to FIGS. 1 and 2, the wrench 10 includes an extension handle 70 slidably received within a bore 75 of the handle portion 20 along the longitudinal axis 30. In the illustrated embodiment, the extension handle 70 and the handle portion 20 collectively define an anti-rotation arrangement 80 that inhibits the extension handle 70 from rotating about the longitudinal axis 30 relative to the handle portion 20. The illustrated anti-rotation arrangement 80 includes two opposing protrusions 85 (FIG. 3) coupled to the extension handle 70 adjacent a first end 90 of the extension handle 70 and two opposing grooves 95 formed in an inner surface of the bore 75. The grooves 95 are sized to receive the protrusions 85, thereby guiding the extension handle 70 axially along the longitudinal axis 30 and inhibiting rotation of the extension handle 70 relative to the handle portion 20. In other embodiments, the anti-rotation arrangement 80 can include one protrusion 85 coupled to the extension handle 70 and received within one groove 95 formed in the bore 75. In further embodiments, at least one protrusion 85 can be coupled to the inner surface of the bore 75 and at least one groove 95 can be formed along an outer circumference of the extension handle 70. In yet further embodiments, the anti-rotation arrangement 80 can be omitted. In addition, the extension handle 70 includes an end cap 100 rotatably coupled to a second end 105 of the extension handle 70 with the end cap 100 including a cap aperture 107 configured to receive a support member (e.g., hanger, nail, etc.) to support the wrench 10 on the support member.

Figure 3:
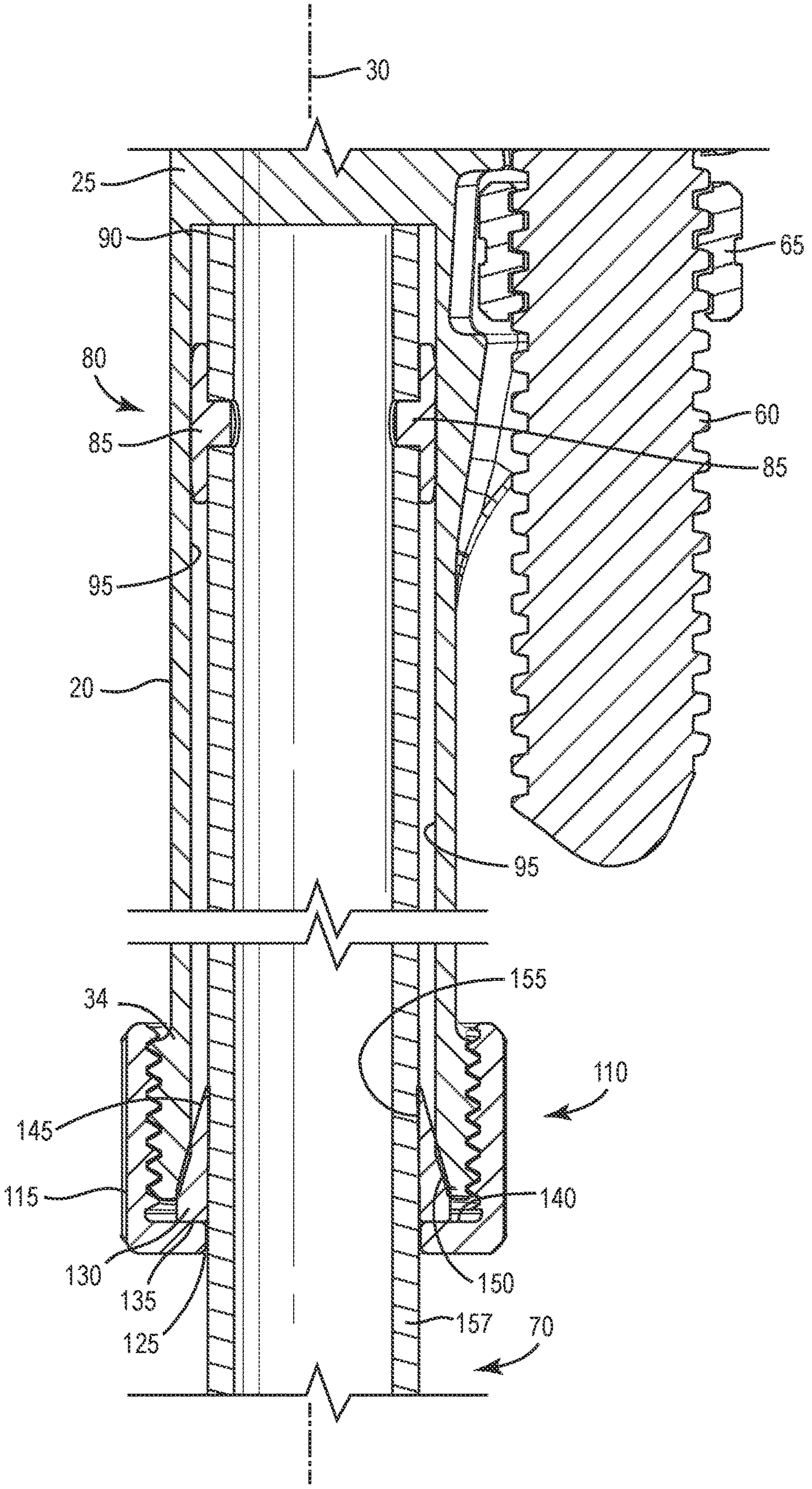
FIG. 3 is a partial cross-sectional view of the wrench along line 3-3 of FIG. 1 illustrating a locking mechanism in a locked position to lock the extension handle relative to the body.
Figure 4:
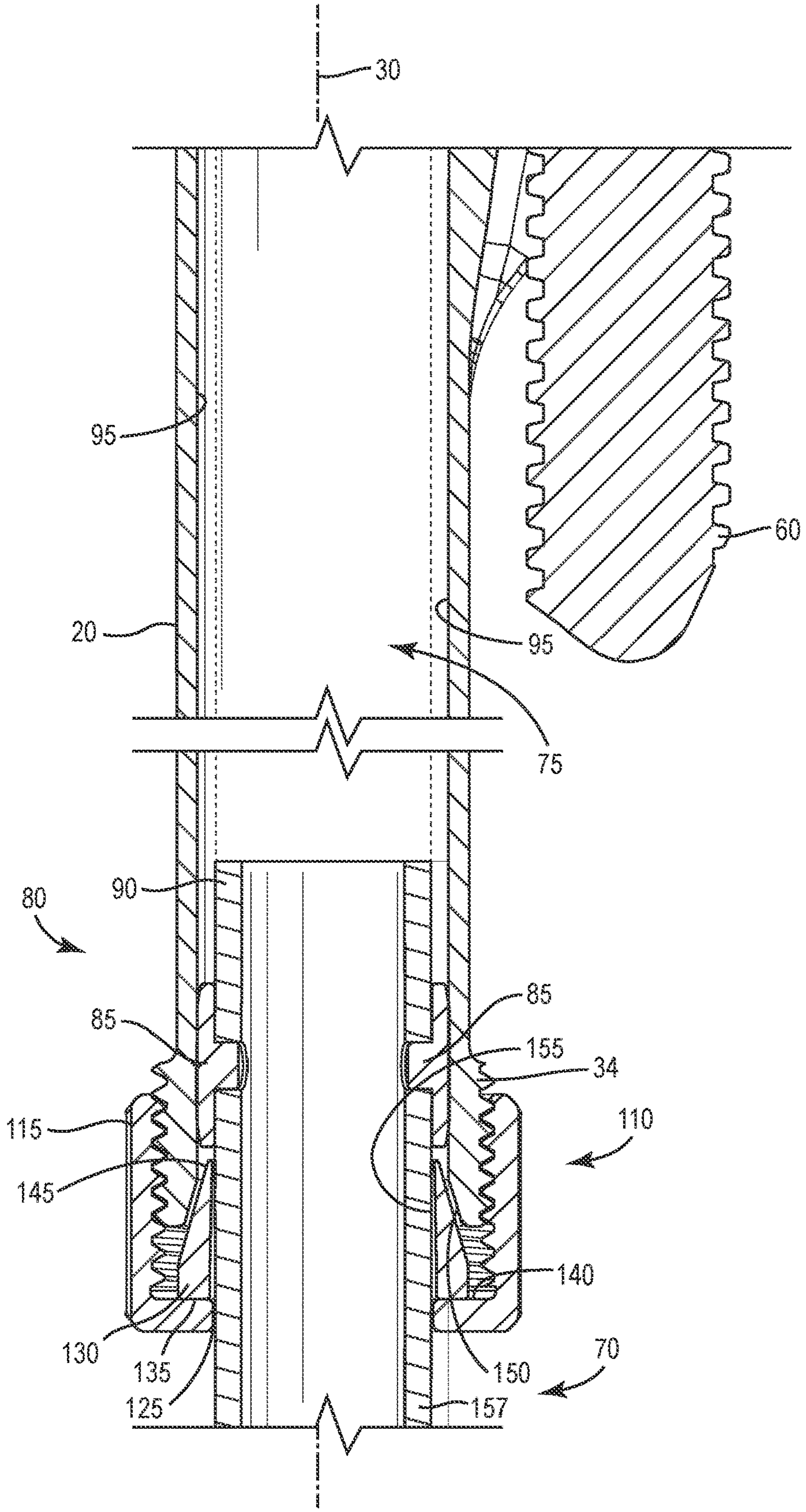
FIG. 4 is a partial cross-sectional view of the wrench along line 3-3 of FIG. 1 illustrating the locking mechanism in an unlocked position to allow movement of the extension handle relative to the body.

As best shown in FIGS. 2-4, the wrench 10 also includes a locking mechanism 110 operable to selectively lock the extension handle 70 relative to the handle portion 20 between at least a retracted position and an extended position. For example, a length of the extension handle 70 received within the bore 75 is greater when the extension handle 70 is in the retracted position (FIG. 3) than when the extension handle 70 is in the extended position (FIG. 4). The illustrated locking mechanism 110 includes an annular collar or ring 115 threadably engaged with the second end 34 of the handle portion 20 (e.g., the second end 34 includes external threads and the collar 115 includes internal threads). The collar 115 includes an opening 125 in which the extension handle 70 extends through. The locking mechanism 110 also includes a resilient annular wedge or grommet 130 positioned between the collar 115, the handle portion 20, and the extension handle 70. In particular, a bottom surface 135 of the wedge 130 interfaces with a substantially planar interior surface 140 of the collar 115, an outer surface 145 of the wedge 130 interfaces with an angled surface 150 of the handle portion 20 (e.g., the angled surface 150 is substantially defined by the bore 75 being countersunk to form an inner chamfer), and an inner surface 155 of the wedge 130 interfaces with an outer circumference 157 of the extension handle 70. The illustrated wedge 130 is generally a frustoconical ring member including tabs 160 tapering in thickness (e.g., tapering toward the head 25). In other embodiments, the bottom surface 135 of the wedge 130 can be fixed to the interior surface 140 of the collar 115 such that the collar 115 and the wedge 130 move together along the longitudinal axis 30.

To lock the extension handle 70 in a desired position relative to the handle portion 20, the collar 115 is rotated in a first direction 165 (FIG. 1) to tighten the collar 115 onto the handle portion 20 (e.g., the collar 115 is rotated to move toward the head 25 of the wrench 10 into a locked position). As a result, the collar 115 moves or pushes the wedge 130 along the longitudinal axis 30 toward the head 25 to be wedged between the extension handle 70 and the handle portion 20 (e.g., the outer surface 145 of the wedge 130 engages the angled surface 150 of the handle portion 20 and the inner surface 155 of the wedge 130 engages the outer circumference 157 of the extension handle 70). The engagement between the wedge 130, the extension handle 70, and the handle portion 20 when the locking mechanism 110 is in the locked position provides enough friction between these components to lock the extension handle 70 relative to the handle portion 20. In addition, the anti-rotation arrangement 80 inhibits the extension handle 70 from rotating while the collar 115 is rotated into the locked position.

To unlock the extension handle 70 allowing the extension handle 70 to move relative to the handle portion 20, the collar 115 is rotated in a second direction 170 (FIG. 1) opposite the first direction 165 so that the collar 115 moves away from the head 25 into an unlocked position to increase the clearance between the interior surface 140 of the collar 115 and the angled surface 150 of the handle portion 20. As such, the wedge 130 can move away from the head 25 allowing the wedge 130 to radially expand to decrease the friction between the wedge 130, the extension handle 70, and the handle portion 20. Once the locking mechanism 110 is in the unlocked position, the extension handle 70 can be adjusted to a desired length beyond the handle portion 20 to be then locked in place by rotating the collar 115 in the first direction 165.

In operation, an operator of the wrench 10 can grip the handle portion 20 and/or the extension handle 70 (a portion of the extension handle 70 extending beyond the handle portion 20) to rotate the wrench 10 and ultimately the workpiece gripped between the teeth 40, 50.

Figure 5:
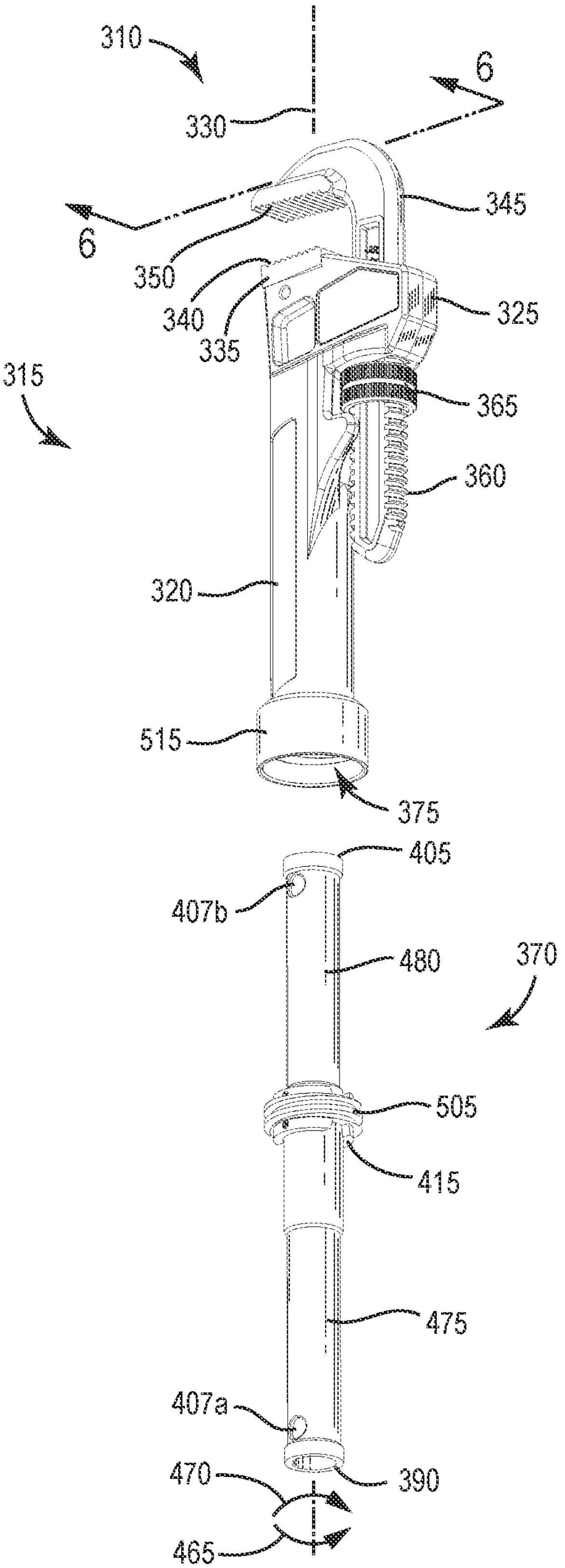
FIG. 5 is a partial exploded view of a wrench according to another embodiment of the invention including an extension handle selectively coupled to a body of the wrench.
Figure 6:
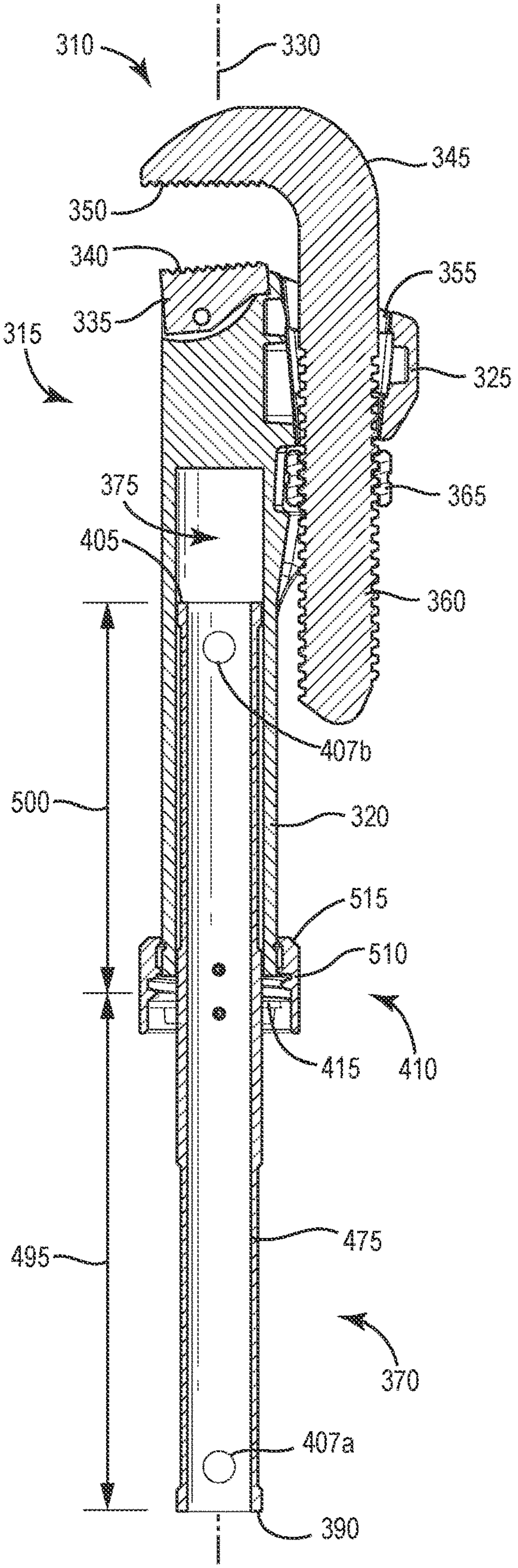
FIG. 6 is a cross-sectional view of the wrench along line 6-6 of FIG. 5 illustrating the extension handle coupled to the body in a first orientation.
Figure 7:
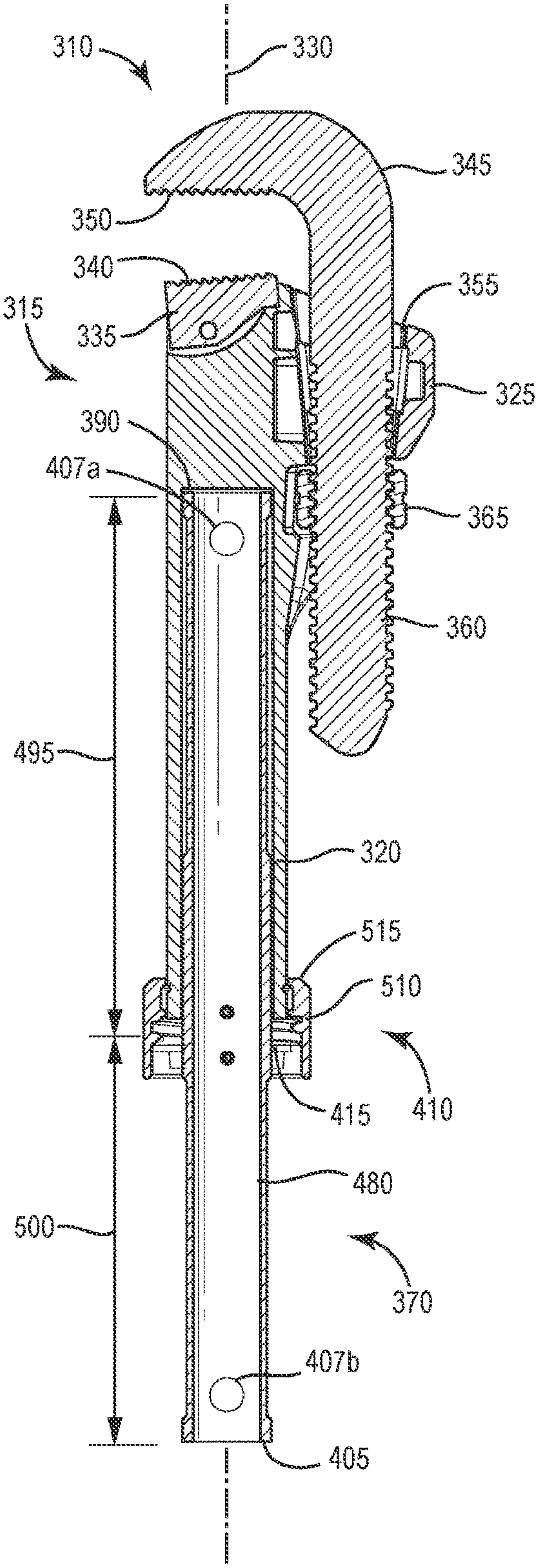
FIG. 7 is a cross-sectional view of the wrench along line 6-6 of FIG. 5 illustrating the extension handle coupled to the body in a second orientation.

FIGS. 5-7 illustrate a wrench 310 according to another embodiment. The wrench 310 is similar to the wrench 10; therefore, similar components are designated with similar references numbers plus 300. At least some differences and/or at least some similarities between the wrenches 10, 310 will be discussed in detail below. In addition, the components or features described with respect to the wrench 10 are equally applicable to components or features described with respect to the wrench 310.

The illustrated wrench 310 includes a body 315 having a handle or gripping portion 320 defining a longitudinal axis 330 and a head 325. A bottom jaw 335, which includes first teeth 340, is coupled to the head 325 and a hook jaw 345, which includes second teeth 350, extends through an aperture 355 of the head 325. The hook jaw 345 includes threads 360 that engage a thumb wheel 365.

The wrench 310 also includes an extension handle 370 selectively coupled within a bore 375 of the handle portion 320. The illustrated extension handle 370 includes a first gripping portion 475, a second gripping portion 480, and a collar or locking member 415 positioned therebetween. With reference to FIGS. 6 and 7, a first length 495 of the first gripping portion 475 (e.g., a distance between a first end 390 of the extension handle 370 and the collar 415) is greater than a second length 500 of the second gripping portion 480 (e.g., a distance between a second end 405 of the extension handle 370 and the collar 415). In other words, the collar 415 is positioned closer to the second end 405 of the extension handle 370 than the first end 390. The illustrated collar 415 includes external threads 505 that threadably engage internal threads 510 of a flange 515 (or end) of the handle portion 320. The collar 415 and the internal threads 510 of the flange 515 define a locking mechanism 410 to selectively secure the extension handle 370 to the handle portion 320. In addition, a first aperture **407*a* is positioned adjacent the first end 390 of the extension handle 370, and a second aperture 407*b* is positioned adjacent the second end 405 of the extension handle 370. The first and second apertures 407*a*, 407*b* are each configured to receive a support member (e.g., hanger, nail, etc.) to support the wrench 310** on the support member.

The illustrated extension handle 370 can be coupled to the handle portion 320 in two orientations. To position the extension handle 370 in a first orientation (FIG. 6), the second gripping portion 480 is slidably received within the bore 375 for the collar 415 to threadably engage the flange 515. With rotation of the extension handle 370 relative to the handle portion 320 in a first direction 465, the extension handle 370 is fastened to the handle portion 320. As such, the first gripping portion 475 extends beyond the handle portion 320 to be gripped by an operator of the wrench 310. To remove the extension handle 370 from the first orientation, the extension handle 370 is rotated in a second direction 470 to disengage the collar 415 from the flange 515 allowing the extension handle 370 to be completely removed from the bore 375.

To position the extension handle 370 in a second orientation (FIG. 7), the extension handle 370 is flipped around so that the first gripping portion 475 is slidably received within the bore 375 for the collar 415 to threadably engage the flange 515. However, with rotation of the extension handle 370 relative to the handle portion 320 in the second direction 470, the extension handle 370 is fastened to the handle portion 320. In other words, rotation of the extension handle 370 in the second direction 470 removes the extension handle 370 from the first orientation or tightens the extension handle 370 in the second orientation. In the second orientation, the second gripping portion 480 extends beyond the handle portion 320 to be gripped by an operator of the wrench 310. To remove the extension handle 370 from the second orientation, the extension handle 370 is rotated relative to the handle portion 320 in the first direction 465 to disengage the collar 415 from the flange 515 allowing the extension handle 370 to be completely removed from the bore 375. In other words, rotation of the extension handle 370 in the first direction 465 removes the extension handle 370 from the second orientation or tightens the extension handle 370 in the first orientation.

As the first gripping portion 475 is longer than the second gripping portion 480, the operator can transmit more torque to the workpiece when the extension handle 370 is in the first orientation than the second orientation.

Figure 8:
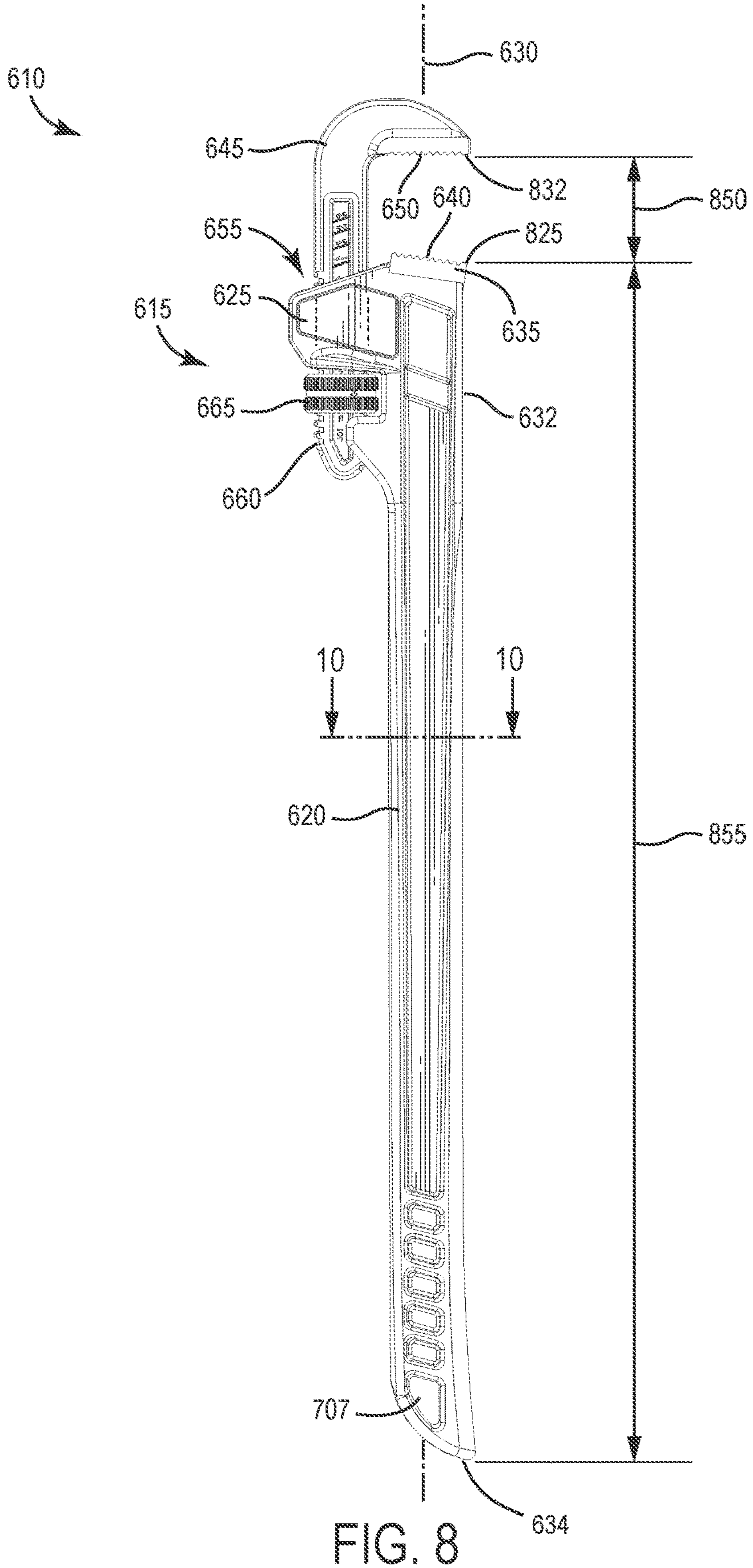
FIG. 8 is a side view of a wrench according to another embodiment of the invention.
Figure 9:
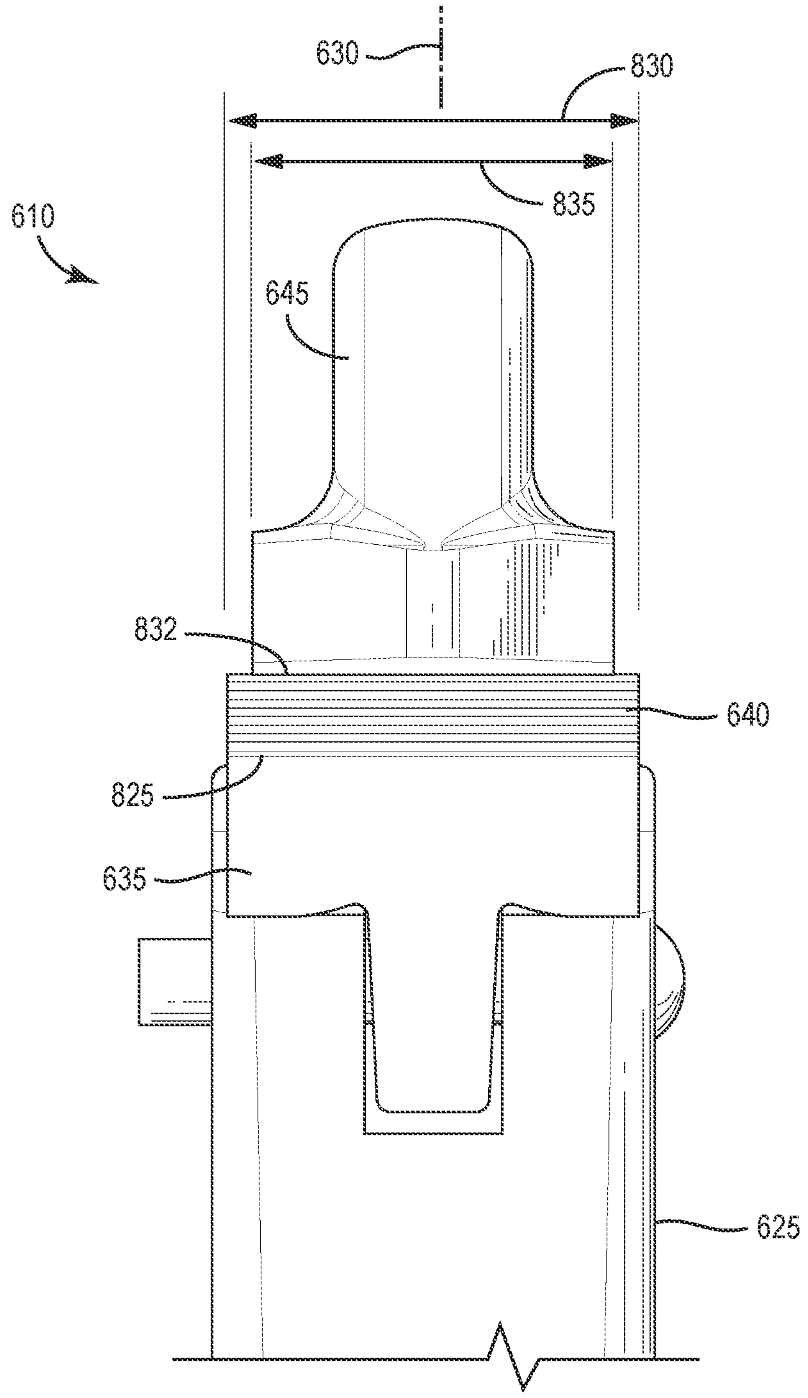
FIG. 9 is a partial front view of the wrench of FIG. 8.
Figure 10:
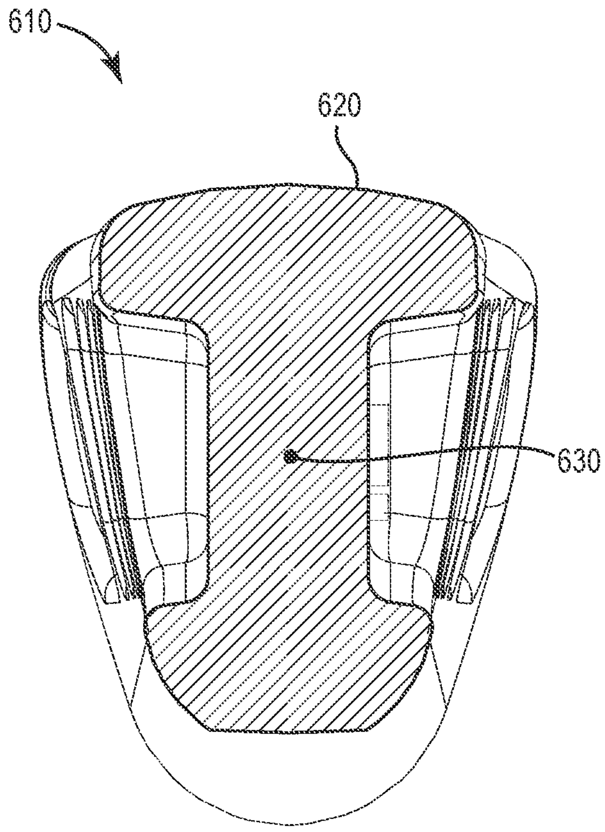
FIG. 10 is a cross-sectional view of the wrench along line 10-10 of FIG. 8.

FIGS. 8-10 illustrate a wrench 610 according to another embodiment. The wrench 610 is similar to the wrench 10; therefore, similar components are designated with similar references numbers plus 600. At least some differences and/or at least some similarities between the wrenches 10, 610 will be discussed in detail below. In addition, the components or features described with respect to the wrenches 10, 310 are equally applicable to components or features described with respect to the wrench 610.

The illustrated wrench 610 includes a body 615 having a handle or gripping portion 620 having first and second ends 632, 634 defining a longitudinal axis 630 and a head 625. The body 615 is manufactured from aluminum (e.g., an aluminum alloy). The illustrated handle portion 620 is integrally formed with the head 625 as a single component. The wrench 610 also includes a bottom jaw 635, which includes first teeth 640, coupled to the head 625. As best shown in FIG. 9, the bottom jaw 635 includes a first edge 825 substantially transverse to the longitudinal axis 630 with the first edge 825 defining a bottom jaw width 830. In the illustrated embodiment, the bottom jaw width 830 is between about 0.7 inches and about 1 inch. In other embodiments, the bottom jaw width 830 can be between about 0.7 inches and about 0.8 inches. In further embodiments, the bottom jaw width 830 can be about 0.74 inches.

The wrench 610 further includes a hook jaw 645, which includes second teeth 650, extending through an aperture 655 of the head 625. As also best shown in FIG. 9, the hook jaw 645 includes a second edge 832 substantially transverse to the longitudinal axis 630 with the second edge 832 defining a hook jaw width 835 with the hook jaw width 835 being less than the bottom jaw width 830. The first and second edges 825, 832 of the teeth 640, 650 define distal edges of the jaws 635, 645 positioned away from the aperture 655 of the head 625. In the illustrated embodiment, the hook jaw width 835 is between about 0.6 inches and about 0.7 inch. In other embodiments, the hook jaw width 835 can be about 0.65 inches. The hook jaw 645 also includes threads 660 that engage a thumb wheel 665 so that when the thumb wheel 665 is rotated in a desired direction, a distance between the first edge 825 of the bottom jaw 635 and the second edge 832 of the hook jaw 645 varies. In the illustrated embodiment, a maximum distance 850 (e.g., a maximum capacity; FIG. 8) between the first and second edges 825, 832 is between about 1 inch and about 2.5 inches. In other embodiments, the maximum distance 850 can be about 2 inches or about 1.5 inches.

With reference back to FIG. 8, the wrench 610 includes a length 855 measured from the second end 634 of the handle portion 620 to the first edge 825 of the bottom jaw 635 parallel to the longitudinal axis 630. In the illustrated embodiment, the length 855 is greater than 10 inches. In other embodiments, the length 855 can be between about 15 inches and about 19 inches. In further embodiments, the length 855 can be about 17.5 inches. In yet further embodiments, the length 855 can be between about 19 inches and about 30 inches.

As best shown in FIG. 10, the handle portion 620 is non-circular in shape. For example, the handle portion 620 includes a substantially I-beam shape (I-shaped profile) in a plane transverse to the longitudinal axis 630. In addition, the handle portion 620 includes an aperture 707 (FIG. 8) adjacent the second end 634 configured to receive a support member (e.g., hanger, nail, etc.) to support the wrench 610 on the support member.

The illustrated wrench 610 includes various relationships, characteristics, and ratios that improve ergonomics in performing tasks (e.g., overhead use of the wrench 610) and allows for use of the wrench 610 including the long handle portion 620 (relative to the size and configuration of the jaws 635, 645) for tasks in which available free space is limited. For example, a ratio of the maximum distance 850 over the length 855 of the wrench 610 is about 0.11. In other embodiments, the ratio of the maximum distance 850 over the length 855 can be between about 0.05 and about 0.17, or the ratio of the maximum distance 850 over the length 855 can be between about 0.07 and about 0.13. In further embodiments, the ratio of the maximum distance 850 over the length 855 can be less than about 0.13. In addition, a ratio of the bottom jaw width 830 over the length 855 of the wrench 610 is about 0.04. In other embodiments, the ratio of the bottom jaw width 830 over the length 855 can be between about 0.04 and about 0.07, or the ratio of the bottom jaw width 830 over the length 855 can be between about 0.03 and about 0.05. In further embodiments, the ratio of the bottom jaw width 830 over the length 855 can be less than about 0.06. Furthermore, a ratio of the bottom jaw width 830 over the maximum distance 850 is about 0.37. In other embodiments, the ratio of the bottom jaw width 830 over the maximum distance 850 can be between about 0.4 and about 0.7, or the ratio of the bottom jaw width 830 over the maximum distance 850 can be between about 0.28 and about 1. In further embodiments, the ratio of the bottom jaw width 830 over the maximum distance 850 can be less than about 1. The wrench 610 includes additional relationships, characteristics, and ratios of the component(s) that improve ergonomics of the wrench 610, which are not explicitly described herein. In other embodiments, at least some of the relationships and ratios described herein are applicable to different pipe wrenches (e.g., pipe wrenches including a smaller or a larger bottom jaw width, a smaller or a larger maximum distance between the jaws, a smaller or a larger length of the handle portion, etc.).

The relationships, characteristics, and ratios of the wrench 610 described herein provide a better performing and a better ergonomic configuration than a conventional pipe wrench including a conduit crimped onto the handle. For example, the illustrated wrench 610 is lighter weight than the conventional pipe wrench including the conduit (advantageous for overhead applications, for example, sprinkler applications), and the illustrated wrench 610 is configured to transmit more torque to the workpiece than the conventional pipe wrench including the conduit.

Although the invention has been described in detail with reference to certain preferred embodiments, variations and modifications exist within the scope and spirit of one or more independent aspects of the invention as described.

Various features and advantages of the invention are set forth in the following claims.

The invention claimed is:

1. A wrench comprising:
- a body including:
  - a head having an aperture, and
  - a handle portion having a bore, the handle portion defining a longitudinal axis;
- a first jaw coupled to the head, the first jaw including first teeth;
- a second jaw extending through the aperture of the head, the second jaw including a threaded portion and second teeth;
- an actuator coupled to the threaded portion of the second jaw such that rotation of the actuator relative to the second jaw moves the second teeth of the second jaw relative to the first teeth of the first jaw;
- an extension handle slidably received within the bore of the handle portion along the longitudinal axis, the extension handle moveable relative to the handle portion between a retracted position and an extended position, wherein the extension handle and the handle portion together define an anti-rotation arrangement that inhibits the extension handle from rotating about the longitudinal axis, the anti-rotation arrangement including an elongated protrusion coupled to and extending along an outward facing surface of the extension handle; and
- a locking mechanism including:
  - a collar coupled to the handle portion and moveable into a locked position to inhibit movement of the extension handle relative to the handle portion and an unlocked position to allow movement of the extension handle relative to the handle portion, the collar including an opening sized for the extension handle to extend through the opening, and
  - an annular wedge engageable with the handle portion and the extension handle when the collar is in the locked position.

2. The wrench of claim 1, wherein the anti-rotation arrangement further includes a groove formed in an inward facing surface of the bore of the handle portion, and wherein the groove is sized to receive the protrusion and the groove extends along the longitudinal axis.

3. The wrench of claim 2, wherein the protrusion has a longitudinal axis that engages the groove along the longitudinal axis of the protrusion.

4. The wrench of claim 1, wherein the collar includes internal threads engageable with external threads of an end of the handle portion.

5. The wrench of claim 4, wherein rotation of the collar about the longitudinal axis into the locked position moves the annular wedge into engagement with an interior angled surface of the handle portion and an outer circumference of the extension handle.

6. The wrench of claim 5, wherein rotation of the collar about the longitudinal axis into the unlocked position allows the annular wedge to disengage from the interior angled surface of the handle portion and the outer circumference of the extension handle.

7. The wrench of claim 1, wherein the annular wedge is a generally frutso-conical shape.

8. The wrench of claim 1, wherein the annular wedge decreases in thickness as the annular wedge approaches the head.

9. The wrench of claim 1, wherein the protrusion extends radially outward from the extension handle, toward the handle portion.

10. The wrench of claim 1, wherein the protrusion has a longitudinal axis that extends along and is aligned with the longitudinal axis defined by the handle portion.

11. The wrench of claim 1, wherein the protrusion is a generally rectangular shape.

12. A wrench comprising:

a body including:

a head having an aperture, and a handle portion having a bore, a proximal end adjacent to the head, and a distal end having a flange connected to the bore, the handle portion defining a longitudinal axis;

a first jaw coupled to the head, the first jaw including first teeth;

a second jaw extending through the aperture of the head, the second jaw including a threaded portion and second teeth;

an actuator coupled to the threaded portion of the second jaw such that rotation of the actuator relative to the second jaw moves the second teeth of the second jaw relative to the first teeth of the first jaw; and an extension handle coupled within the bore of the handle portion and extending along the longitudinal axis in a first orientation and a second orientation, the extension handle including:

a first end, a second end opposing the first end, a first aperture extending through the extension handle and positioned adjacent to the first end of the extension handle, the first aperture configured to receive a support member, a first gripping portion defining a first length, the first gripping portion extends beyond the handle portion when the extension handle is in the first orientation, a second gripping portion defining a second length, the second length being less than the first length, the second gripping portion extends beyond the handle portion when the extension handle is in the second orientation, and a locking member positioned between the first gripping portion and the second gripping portion, the locking member engaging the flange of the handle portion to secure the extension handle in the first orientation and the second orientation, wherein the flange projects radially outward relative to the proximal end of the handle portion, and wherein the flange includes internal threads on an interior surface.

13. The wrench of claim 12, wherein the locking member is a collar fixed to the extension handle, and wherein the collar includes external threads engageable with the internal threads of the flange of the handle portion.

14. The wrench of claim 13, wherein the extension handle is rotated in a first direction to secure the extension handle in the first orientation, and wherein the extension handle is rotated in a second direction to secure the extension handle in the second orientation.

15. The wrench of claim 14, wherein the extension handle is rotated in the second direction to remove the extension handle from the first orientation, and wherein the extension handle is rotated in the first direction to remove the extension handle from the second orientation.

16. The wrench of claim 12, further comprising a second aperture extending through the extension handle and positioned adjacent to the second end of the extension handle, the second aperture configured to receive the support member such that the wrench is supported on the support member.

17. The wrench of claim 12, further comprising a second aperture extending through the extension handle, wherein the support member is a hanger.

18. The wrench of claim 12, wherein the proximal end has a first outer dimension and the flange has a second outer dimension, and wherein the second outer dimension is greater than the first outer dimension.

* * * * *